United States Patent
Hwang et al.

(10) Patent No.: US 6,456,602 B1
(45) Date of Patent: Sep. 24, 2002

(54) METHOD AND APPARATUS FOR ACHIEVING FREQUENCY DIVERSITY BY USE OF MULTIPLE IMAGES

(75) Inventors: Chien-Meen Hwang; Muoi V. Huynh, both of San Jose; Maged F. Barsoum, Sunnyvale; Hungming Chang, Cupertino; Eugen Gershon, San Jose, all of CA (US)

(73) Assignee: Legerity, Austin, TX (US)

( * ) Notice: Subject to any disclaimer, the term of this patent is extended or adjusted under 35 U.S.C. 154(b) by 0 days.

(21) Appl. No.: 09/286,992

(22) Filed: Apr. 7, 1999

(51) Int. Cl.⁷ .................................................. H04J 3/00
(52) U.S. Cl. ....................................................... 370/307
(58) Field of Search .................................. 370/307, 320, 370/337, 346, 395.5, 498; 375/131, 132, 220–222

(56) References Cited

U.S. PATENT DOCUMENTS

| | | | | |
|---|---|---|---|---|
| 5,182,749 A | * | 1/1993 | Kazecki et al. | 370/498 |
| 5,886,989 A | * | 3/1999 | Evans et al. | 370/346 |
| 6,108,317 A | * | 8/2000 | Jones et al. | 370/320 |
| 6,151,312 A | * | 11/2000 | Evans et al. | 370/337 |
| 6,285,671 B1 | * | 9/2001 | Kolze et al. | 370/395.5 |

* cited by examiner

Primary Examiner—Salvatore Cangialosi
(74) Attorney, Agent, or Firm—McDermott, Will & Emery (57) ABSTRACT

A physical layer device (PHY) device in a home LAN employs discrete multitone technology (DMT). The DMT system enables usage of existing residential wiring, which typically is telephone system grade twisted copper pair. The PHY device comprises a spectral image selection circuit to increase frequency diversity by examining all the images captured by a filter and restoring the transmitted signal based upon an image that may not be associated with the carrier frequency but its harmonics. Alternatively, the PHY device adjusts the sampling rate of its digital to analog convertor and accordingly filters to achieve desired grouping of spectral images.

24 Claims, 6 Drawing Sheets

METHOD AND APPARATUS FOR ACHIEVING FREQUENCY DIVERSITY BY USE OF MULTIPLE IMAGES

BACKGROUND OF THE INVENTION

1. Field of the Invention

The present invention relates to a discrete multi-tone (DMT) data communications network, more particularly to techniques relating to a DMT transceiver using frequency diversity.

2. Description of the Related Art

Modern society continues to create exponentially increasing demands for digital information and the communication of such information between data devices. Local area networks use a network, cable or other media to link stations on the network for exchange of information in the form of packets of digital data. A typical local area network architecture uses a media access control (MAC) enabling network interface cards at each station to share access to the media. Most conventional local area network architectures use media access controllers operating according to half-duplex or full-duplex Ethernet (ANSI/IEEE standard 802.3) protocol and a prescribed network medium, such as twisted pair cable.

These architectures have proven quite successful in providing data communications in commercial applications. However, these common local area network architectures require installation of specialized wiring and use of specific wiring topologies. For example, the most popular network protocols, such as Ethernet, require special rules for the wiring, for example with regard to quality of wire, range of transmission and termination.

Due to the success of the Internet and the rapid decreases in the prices of personal computers and associated data equipment, a demand has arisen for data communications between a limited number of devices within relatively small premises, typically a residence or small business. While existing local area networks can serve the purpose, in such installations, the cost of installing physical network wiring satisfying the rules for the particular protocol can be prohibitively expensive.

Most existing buildings, including residences, include some existing wiring, for phones, electrical power and the like. Proposals have been made to communicate data using such existing infrastructure. This reduces the costs of wiring for the network, but the existing wiring raises a variety of issues regarding transport of high-speed digital signals.

For example, efforts are underway to develop an architecture that enables computers to be linked together using conventional twisted pair telephone lines. Such an arrangement, referred to herein as a home network environment, provides the advantage that existing telephone wiring in a home may be used to implement a home network environment without incurring costs for substantial new wiring installation. However, any such network must deal with issues relating to the specific nature of in-home telephone wiring, such as operation over a media shared with other services without interference from or interfering with the other services, irregular topology, and noise. With respect to the noise issue, every device on the telephone line may be a thermal noise source, and the wiring may act much like an antenna to pick up disruptive radio signal noise. Telephone lines are inherently noisy due to spurious noise caused by electrical devices in the home, for example dimmer switches, transformers of home appliances, etc. In addition, the twisted pair telephone lines suffer from turn-on transients due to on-hook and off-hook and noise pulses from the standard telephones coupled to the lines, and electrical systems such as heating and air conditioning systems, etc.

An additional problem in telephone wiring networks is that the signal condition (i.e., shape) of a transmitted waveform depends largely on the wiring topology. Numerous branch connections in the twisted pair telephone line medium, as well as the different associated lengths of the branch connections, may cause multiple signal reflections on a transmitted network signal. Telephone wiring topology may cause the network signal from one network station to have a peak-to-peak voltage on the order of 10 to 20 millivolts, whereas network signals from another network station may have a value on the order of one to two volts. Hence, the amplitude and shape of a received pulse may be so distorted that recovery of a transmit clock or transmit data from the received pulse becomes substantially difficult.

At the same time a number of XDSL technologies are being developed and are in early stages of deployment, for providing substantially higher rates of data communication over twisted pair telephone wiring of the telephone network. XDSL here is used as a generic term for a group of higher-rate digital subscriber line communication schemes capable of utilizing twisted pair wiring from an office or other terminal node of a telephone network to the subscriber premises. Examples under various stages of development include ADSL (Asymmetrical Digital Subscriber Line), HDSL (High data rate Digital Subscriber Line) and VDSL (Very high data rate Digital Subscriber Line).

Consider ADSL as a representative example. For an ADSL-based related service, the user's telephone network carrier installs one ADSL modem unit at the network end of the user's existing twisted-pair copper telephone wiring. Typically, this modem is installed in the serving central office or in the remote terminal of a digital loop carrier system. The user obtains a compatible ADSL modem and connects that modem to the customer premises end of the telephone wiring. The user's computer connects to the modem. The central office modem is sometimes referred to as an ADSL Terminal Unit—Central Office or 'ATU-C'. The customer premises modem is sometimes referred to as an ADSL Terminal Unit—Remote or 'ATU-R'. The ADSL user's normal telephone equipment also connects to the line through a frequency combiner/splitter, which is incorporated in the ATU-R. The normal telephone signals are split off at both ends of the line and processed in the normal manner.

For digital data communication purposes, the ATU-C and ATU-R modem units create at least two logical channels in the frequency spectrum above that used for the normal telephone traffic. One of these channels is a medium speed duplex channel; the other is a high-speed downstream only channel. Two techniques are under development for dividing the usable bandwidth of the telephone line to provide these channels. One approach uses Echo Cancellation. Currently, the most common approach is to divide the usable bandwidth of a twisted wire pair telephone line by frequency, that is to say by Frequency Division Multiplexing (FDM).

FDM uses one frequency band for upstream data and another frequency band for downstream data. The downstream path is then divided by time division multiplexing into one or more high-speed channels and one or more low speed channels. The upstream path also may be time-division multiplexed into corresponding low speed channels.

The FDM data transport for ADSL services utilizes discrete multi-tone (DMT) technology. A DMT signal is basically the sum of N independently QAM modulated signals, each carried over a distinct carrier frequency channel. The frequency separation between consecutive carriers is 4.3125 kHz with a total number of 256 carriers or tones (ANSI). An asymmetrical implementation of this 256 tone-carrier DMT coding scheme might use tones 32–255 to provide a downstream channel of approximately 1 MHz analog bandwidth. In such an implementation, tones 8–31 are used as carriers to provide an upstream channel of approximately 100 kHz analog bandwidth. Each tone is quadrature amplitude modulated (QAM) to carry up to 15 bits of data on each cycle of the tone waveform (symbol).

Figure 6:
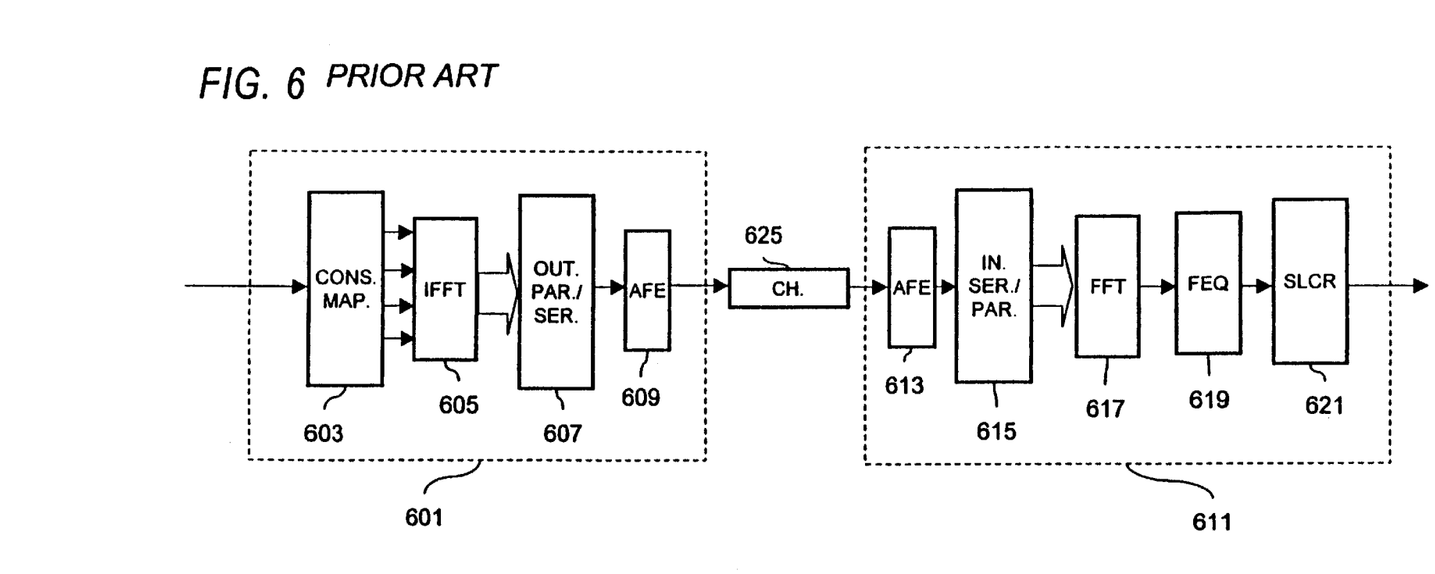
FIG. 6 is a block diagram of a conventional DMT system.

A conventional DMT system is shown in FIG. 6. The transmitter 601 includes a constellation point mapper 603 for logically mapping input bit streams onto a complex plane, whereby each sequence of bits (e.g., 2 bits) is equated to a complex number (i.e., constellation point). A constellation point represents the amplitude and phase of a particular tone. A typical ADSL system, for instance, employs 256 tones. An inverse Fast Fourier transform (IFFT) 605 then converts the constellation points, which provide information in the frequency-domain, to time-domain waveforms for transmission over the channel 625. Each conversion transforms 256 constellation points (complex numbers) into 512 samples of the time domain waveform. A parallel-to-serial block 607 clocks the samples out in a serial sequence for input to the analog front end (AFE) block 609, which is described below in the discussion of FIG. 7. The AFE block 609 outputs the actual bandpass waveform that is transmitted across the channel 625.

On the receiver side, the bandpass signal enters the receive AFE block 613. The AFE block 613 outputs a serial sequence of the digitized received waveforms to the input of the serial/parallel block 613, which converts the serial stream into a parallel set of data. The parallel data is then input into a Fast Fourier transform (FFT) 617 to extract the corresponding frequency-domain signals. The resulting frequency-domain data may display spectral power loss mainly because of the channel attenuation and digital to analog (D/A) conversion. Accordingly, the received signals usually undergo equalization to restore their spectral energy distributions. Slicer 621 then performs decoding of the complex numbers to corresponding bit streams.

Figure 7:
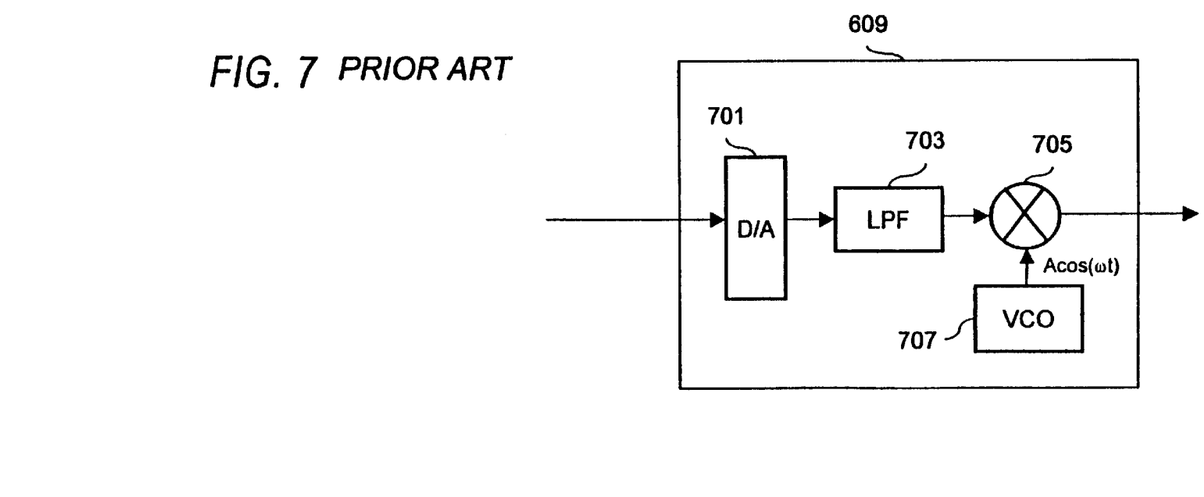
FIG. 7 is a block diagram of a conventional AFE circuit of the DMT system of FIG. 6.

FIG. 7 illustrates a traditional transmitter side AFE block 609 employed in the DMT system of FIG. 6. This transmitter side AFE block 609 comprises essentially four basic components: a D/A convertor 701, low pass filter (LPF) 703, mixer 705, and a voltage controlled oscillator 707. The digital waveforms from the IFFT 605 are converted to an analog waveform (i.e., baseband signal). The baseband signal is fed into the LPF 703 to eliminate unwanted high frequencies; a typical cutoff frequency of the LPF 703 is 138 kHz. The filtered baseband signal is then up converted by mixer 705; the voltage controlled oscillator (VCO) 707 supplies a sinusoidal signal with an amplitude of A and frequency of $\omega$ to the mixer 705. The mixer 705 and the VCO 707 operator as a modulator. The AFE block 613 for the receiver side performs the above operations in essentially the reverse sequence. That is, the AFE block 613 receives the bandpass signal from the channel 625 and down converts it to restore the baseband signal. The baseband signal is then input to a LPF and then digitized with an analog to digital (A/D) convertor (not shown).

The existing DSL systems provide effective high-speed data communications over twisted pair wiring between customer premises and corresponding network-side units, for example located at a central office of the telephone network. The DSL modem units overcome many of the problems involved in data communication over twisted pair wiring. However, for a number of reasons, the existing DSL units are not suitable to providing local area network type communications within a customer's premises. For example, existing ADSL units are designed for point-to-point communication. That is to say, one ATU-R at the residence communicates with one ATU-C unit on the network end of the customer's line. There is no way to use the units for multi-point communications. Also, the existing ADSL modems tend to be quite complex, and therefore are too expensive for in-home communications between multiple data devices of one customer.

A need therefore still exists for techniques to adapt DMT type DSL communications for use over the existing noisy in-home wiring. The adaptations should enable multi-point communications, which poses the problem of signal reflections due to improper terminations, resulting in the corruption of various tones. One approach has been to reduce the data rate to avoid using the corrupt tones. However, data rate reduction has the attendant problem of slow user response times. Because of the noisy characteristics of a conventional residential wiring, a home DMT solution requires a system that is tolerant to channel noise.

SUMMARY OF THE INVENTION

There exists a need for a DMT system that is tailored for use over existing in-home wiring. In particular, the DMT system needs to provide a technique that is tolerant to channel impairments.

These and other needs are satisfied by the present invention, where a communication system includes a transmitter circuit that outputs a symbol represented by differentially encoded signals over a range of frequencies (or tones). The communication system also includes a receiver that provides frequency diversity by capturing usable spectral images associated with each of the carrier frequencies.

According to one aspect of the present invention, a communication system for transmitting a bit stream, comprises a transmitter circuit that generates a symbol. The symbol includes differentially encoded signals, in which each of the differentially encoded signals is mapped to one of a plurality of carrier frequencies based upon the bit stream. A receiver circuit receives the symbol and decodes the differentially encoded signals portion of the symbol to output the bit stream. Each received differentially encoded signal has a plurality of spectral images associated with the corresponding carrier frequency and its harmonics. The receiver includes a spectral image selection logic that individually selects one or more of the spectral images based upon power spectral densities of such spectral images to reconstruct the differentially encoded signals. This arrangement advantageously provides frequency diversity to avoid costly retransmissions.

In another aspect of the present invention, a communication system for transmitting a bit stream comprises a transmitter circuit that generates a symbol. The symbol includes differentially encoded signals. Each of the differentially encoded signals is mapped to one of a plurality of carrier frequencies based upon the bit stream. A receiver circuit receives the symbol and decodes the differentially encoded signals to output the bit stream. Each of the received differentially encoded signals has a plurality of spectral images associated with the corresponding carrier frequency and its harmonics. The transmitter circuit selectively filters the differentially encoded signals of the symbol to pass a prescribed number of spectral images based upon a predetermined sampling rate of the differentially encoded signals. This arrangement provides a cost-effective approach to achieving a high data throughput.

Another aspect of the present invention provides a method for transmitting a bit stream. The method comprises generating a symbol comprising differentially encoded signals based upon the bit stream via a plurality of carrier frequencies. The method also includes receiving the symbol and decoding the differentially encoded signals of the symbol to output the bit stream. Each of the received encoded signals has a plurality of spectral images associated with the corresponding carrier frequency and harmonics of the carrier frequency. Further, the method includes providing frequency diversity by analyzing at least one of the harmonics. The above method provides a noise tolerant system.

In another aspect of the present invention, an arrangement robustly transmits and receives information. The arrangement comprises a transmitter that is configured to transmit redundant frequency components of a signal. A receiver is configured to sample the transmitted signal at a sampling rate that causes at least two of the redundant frequency components to completely overlap. This arrangement achieves frequency diversity, thereby minimizing the impact of channel response.

Yet another aspect of the present invention provides a method for communicating information. The method comprises transmitting a signal with redundant frequency components that carry the same information. The method also includes receiving the signal and sampling the received signal at a sampling rate that causes at least two of the redundant frequency components to completely overlap. This method permits receipt of information inspite of poor channel characteristics.

Additional advantages and novel features of the invention will be set forth in part in the description which follows, and in part may become apparent to those skilled in the art upon examination of the following or may be learned by practice of the invention. The advantages of the invention may be realized and attained by means of the instrumentalities and combinations particularly pointed out in the appended claims.

DETAILED DESCRIPTION OF ILLUSTRATIVE EMBODIMENTS

The present invention contemplates using the present invention to provide frequency diversity in a DMT system, such as a DMT transceiver that utilizes differential encoding. It will become apparent, however, that the present invention is also applicable to other types of communication systems and devices.

Figure 1:
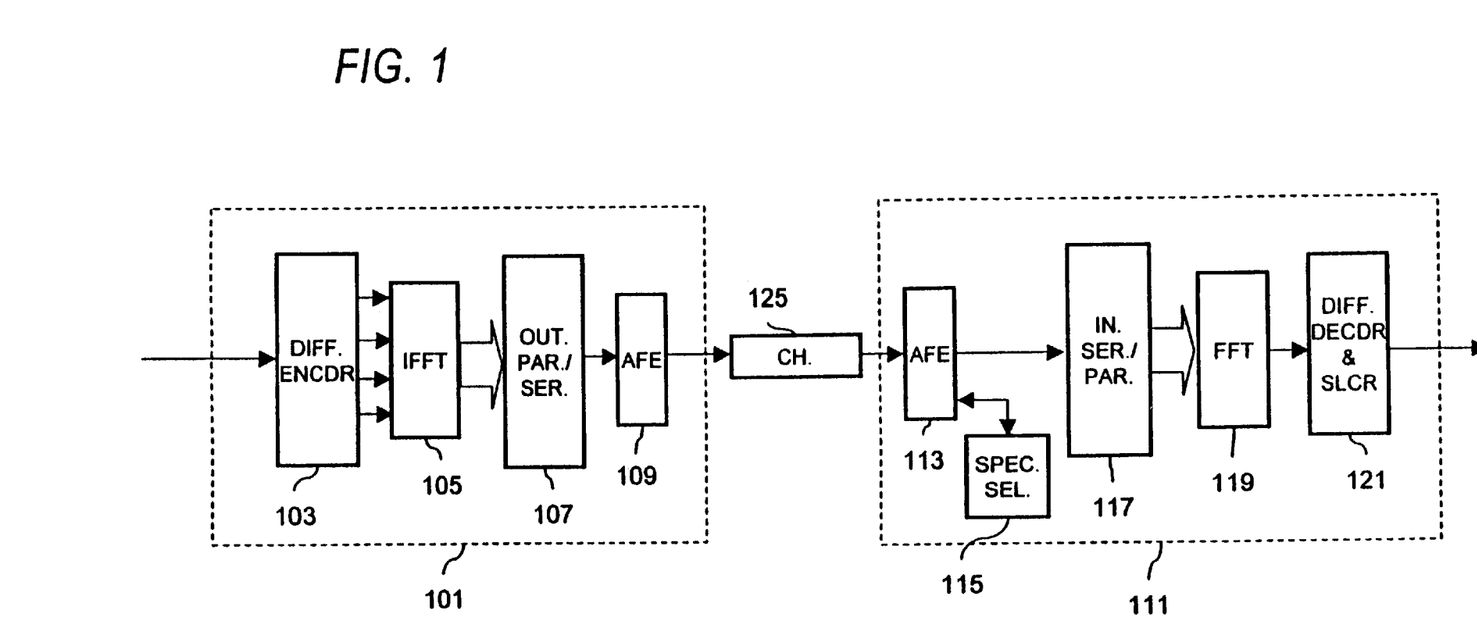
FIG. 1 is a block diagram of a DMT system according to an embodiment of the present invention.

FIG. 1 is a block diagram of a DMT system in which the present invention may be advantageously employed. A transmitter circuit 101 communicates with a receiver circuit 111 over a physical channel 125, which in an exemplary embodiment is a twisted pair infrastructure. In the implementation of a DMT transceiver (not shown), the transmitter circuit and the receiver circuit both reside on a single printed circuit board. Consequently, two DMT transceivers would be required to communicate across the channel 125. For purposes of explanation, FIG. 1 simply shows a transmitter circuit 101 sending data signals to a receiver circuit 111.

The transmitter 101 receives a digital bit stream from a digital source, for example, a host central processing unit (CPU) (not shown). The bit stream enters the differential encoder 103, which maps bit sequences of the bit stream to points on the complex plane (i.e., constellation points), in similar fashion to the operating principles of QPSK (quaternary phase shift keying). However, unlike QPSK, the differential encoder 103 encodes the difference between a current constellation point with a reference constellation point. The phase difference between constellation points represents two bits. The reference point is transmitted in a reference symbol prior to sending the symbols that contain actual data bits. In an exemplary embodiment, the differential encoder 103 encodes a bit stream in bit sequences of 2-bits using 256 frequencies (or tones); as a result, a symbol represents 512 bits. Because the encoding scheme focuses on amplitude and phase differences, absolute signal values are not needed for correctly detecting and decoding the received symbols. As such, this technique eliminates the need for a frequency domain equalizer (FEQ) to compensate for amplitude and phase distortion caused by the channel 125. The concept of differential encoding is more fully described below in the discussion of FIG. 3.

The output of the differential encoder 103 is a parallel array of "complex numbers." These complex numbers are input in a parallel manner to an Inverse Fast Fourier Transform (IFFT) logic 105. The IFFT logic 105 converts the complex numbers into time-domain waveforms, which are then supplied to an output parallel-to-serial logic 107. The output parallel-to-serial logic 107 basically arranges the time-domain waveform into a serial stream of samples. A guard band or cyclic-prefix can be prepended to this serial stream before entering the analog front end (AFE) circuit 109 to minimize intersymbol interference (ISI). ISI is an overlapping of waveforms that distorts all symbols involved, potentially resulting in data loss. The AFE circuit 109 is discussed in more detail with respect to FIG. 2b. Among other functions, the AFE circuit 109 performs digital to analog (D/A) conversion and sends the symbol, which includes the differentially encoded signals, over channel 125 to receiver 111.

As mentioned previously, the noise within the in-home twisted pair wiring is quite pronounced. Also, because of reflections caused by improper terminations, deep nulls are formed at certain frequencies on the home network. Further, as the symbol propagates through the channel 125, the symbol is attenuated when it arrives at the receiver 111. The receiver 111 of FIG. 1, nonetheless, enables recovery of the transmitted symbol. The receiver 111 receives the symbol using the AFE circuit 113, which is responsible for filtering the analog waveform of the symbol and converting it to a digital waveform. The spectral image selection logic 115 (or frequency selector) is coupled to the AFE circuit 113 to analyze the received spectral images, and thus, provides frequency diversity to the DMT system.

Figure 2A:
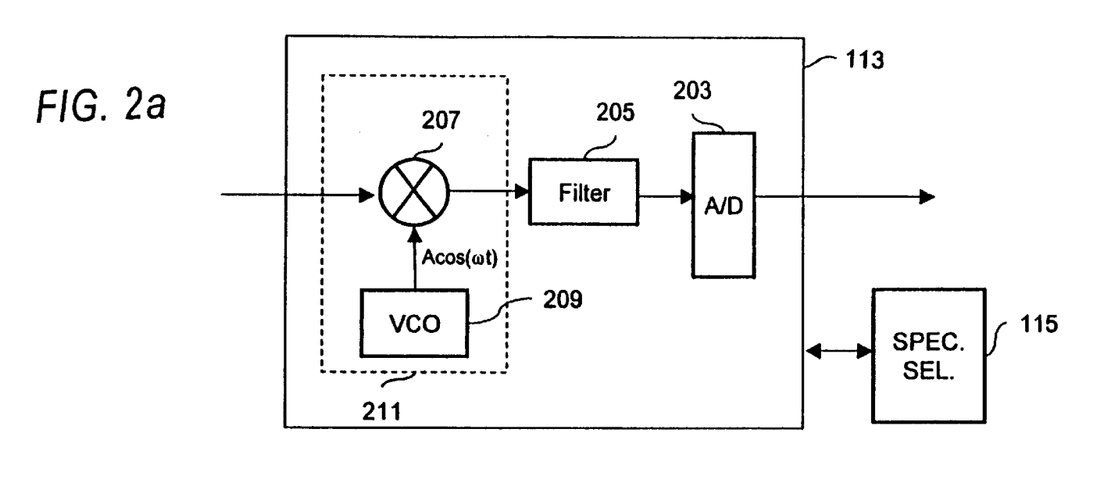
FIGS. 2a and 2b are block diagrams of the receiver side AFE circuit and transmitter side AFE circuit, respectively, of the DMT system of FIG. 1.
Figure 2B:
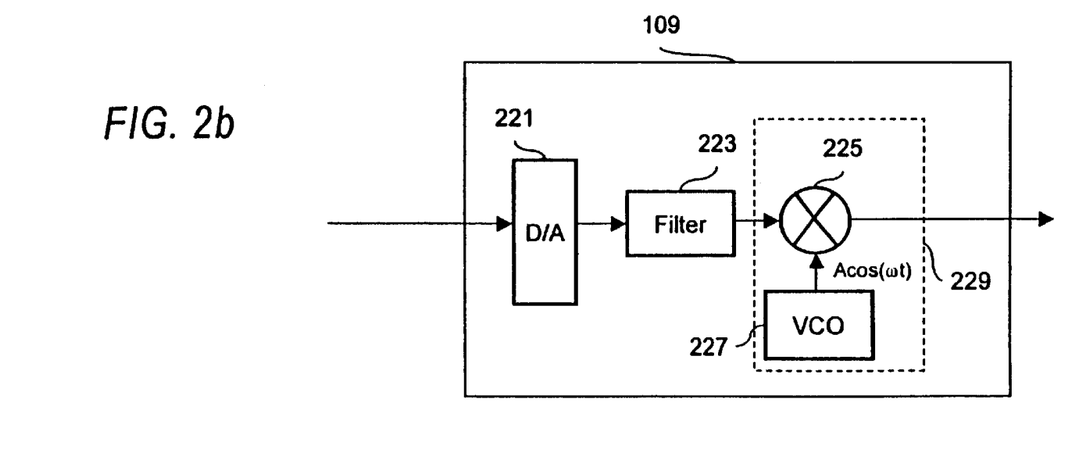

Frequency diversity in general is a technique that uses multiple frequency channels, whereby a degradation of one channel is counterbalanced by a low distortion channel that contains the same information. Each tone possesses a primary spectral image at the baseband frequency and usually smaller images within passbands at the harmonic frequencies (i.e., integer multiples of the carrier frequency) (shown in FIG. 4, which will be discussed later). According to an embodiment of the present invention, the spectral image selection logic 115 (or frequency selector) analyzes the spectral power of each frequency (or tone) and orders the spectral images according to their respective power spectral densities (PSDs). The spectral image selection logic 115 then selects the spectral image(s) with the high PSDs to represent the waveform. Details of this approach is further discussed below (FIG. 2a). Alternatively, in another embodiment, frequency diversity is effected at the transmitter side through appropriate selection of sampling rate and filtering to allow recovery of spectral images with high PSDs; FIG. 2b discusses this alternative in greater detail.

The sampling rate is chosen at the receiver so that at least two redundant frequencies completely overlap. Assuming an analog waveform $f_a(t)$, with spectrum $F(f)$, the sampled signal spectrum is $F_d(f)=\Sigma F(f-nf_s)$, where n is an integer from negative infinity to positive infinity. Hence, by proper selection of the sampling rate ($f_s$), if one of the components is eliminated by noise, another component can be used for demodulation.

As seen in FIG. 1, after processing of the received signal by the AFE 113, the digitized or discrete waveforms are input to an input serial-to-parallel logic 117 for conversion to a parallel array of analog waveforms. A Fast Fourier Transform logic 119 converts these waveforms back to complex numbers, which are then mapped by the differential decoder and slicer 121 to corresponding bit sequences to recreate the original bit stream. Errors in the bit stream or loss of bits can be minimized through the use of these two different frequency diversity techniques.

It should be apparent to one of ordinary skill in the art that the invention applies to different types of information carried by the analog signals transmitted. These include time marks, reference symbols, and the symbols themselves.

FIG. 2a shows the receiver side AFE circuit 113 cooperatively operating with the spectral image selection logic 115 to implement one of the frequency diversity technique in accordance with an embodiment of the present invention. An exemplary AFE circuit 113 comprises a demodulator 211 for down converting the symbol, which is then filtered via a filter 205. The filter 205 outputs the filtered analog waveform to an analog to digital (A/D) convertor 203 for digitization. A closer inspection of the demodulator 211 reveals that it contains at least two basic components: a voltage controlled oscillator 211 and a mixer 207. The mixer 207 multiplies the received symbol with a sinusoidal signal, e.g., $A\cos(\omega t)$.

The resultant signal is sent to the filter 205. Under normal operating conditions, it is quite possible that the image on the carrier frequency is severely attenuated. However, the information also resides on the harmonics of the carrier frequency. The spectral image selection logic 115 examines the spectral images within the symbol and computes the power spectral density (PSD) of each of the differentially encoded signals within the symbol. The PSD is defined as the normalized average power of the waveform. For each tone or frequency, the spectral image selection logic 115 analyzes the images contained within each tone to select the image(s) with the high PSD(s). The spectral image selection logic 115 may employ thresholding against a predetermined value. The appropriate harmonics are then isolated by the spectral image selection logic 115 so that a non-corrupt baseband signal can be obtained.

In an alternative embodiment, the spectral image selection logic 115 is not used. Instead, the transmitter circuit is appropriately designed taking into consideration the following parameters: sampling rate and filter bandwidth. As shown in FIG. 2b, the transmitter side AFE circuit 109 receives a digital symbol at its digital to analog (D/A) convertor 221, which outputs a corresponding analog waveform. The analog waveform is then filtered via filter 223. To provide for frequency diversity, the spectral images on the harmonics of the carrier frequency can be manipulated by increasing or decreasing the sampling rate of the D/A convertor 221 so that these harmonic images fall under the filter range of filter 223. These images are then demodulated by demodulator 229. The demodulator 229 has a mixer 225, which multiplies the filtered signal with a sinusoidal signal provided by VCO 227. The above arrangement advantageously permits recovery of the transmitted symbol by the receiver 101 despite poor channel conditions due to signal reflections and electrical noise.

Figure 3:
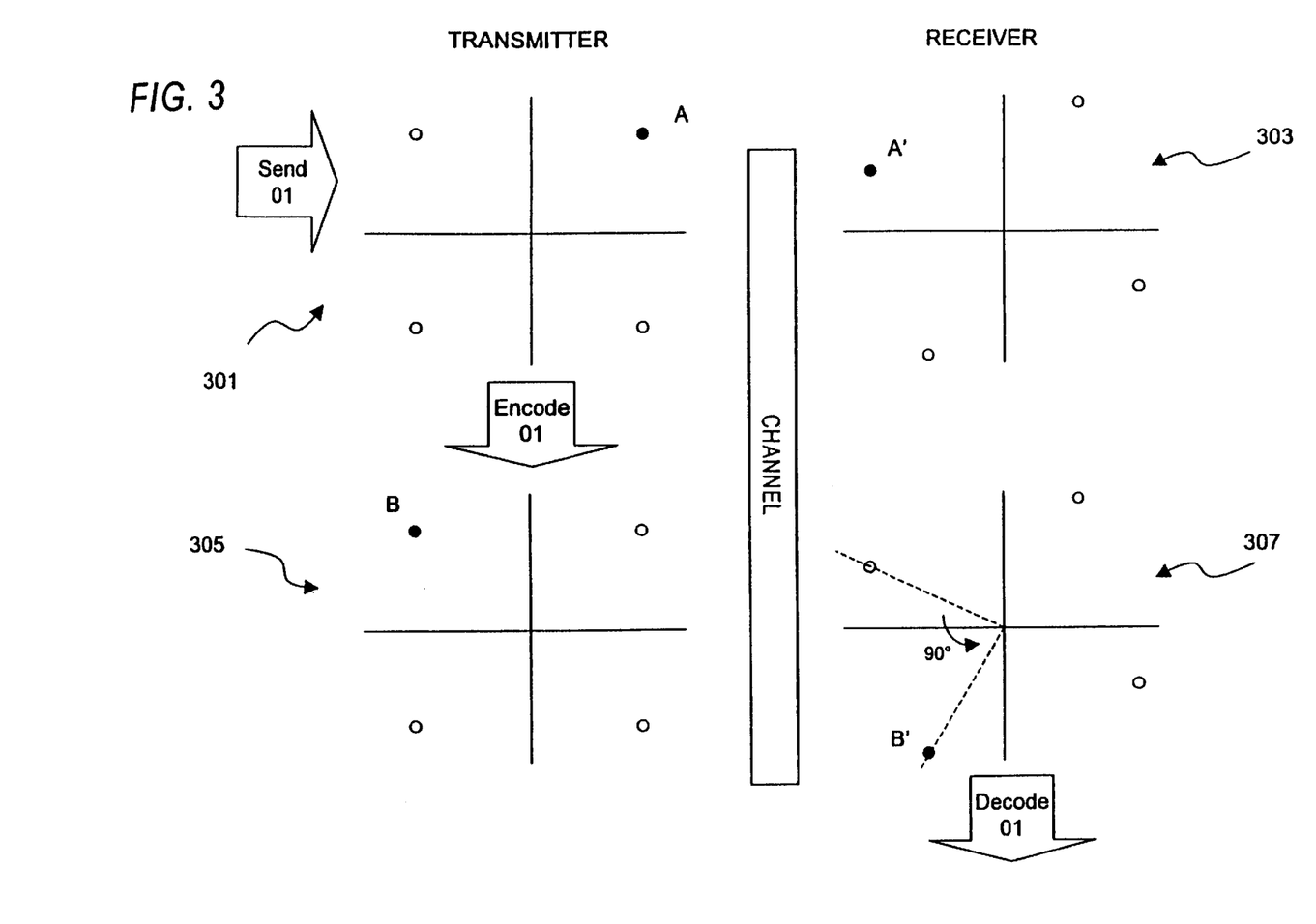
FIG. 3 is a diagram illustrating the concept of differential encoding in a DMT system in accordance with an embodiment of the present invention.

The DMT system of the present invention inherently provides tolerance to noise because of the use of differential encoding. FIG. 3 illustrates the general principle of this coding scheme, where the graphs 301 and 303 represent a previously sent symbol and the bottom graphs represent the current symbol that is to be transmitted over the channel 125. For example, assume the transmitter circuit 101 receives a bit stream in which 0.1 is the first bit sequence. Under this exemplary scheme, the bit sequence is 2 bits in length; however, N bits can be used in which the number of constellation points would equal $2^N$. The transmitter first sends a reference symbol, which randomly assigns a reference point the complex plane for each tone. In this particular example, the reference point of this tone is point A (graph 301). Because of channel response, the reference point may be altered to point A', shown in graph 303. Now, assume that the mapping of the bit sequence 01 is to point B (on graph 305), which is a 90° phase shift. That is, a 90° phase shift represents bits 01. The symbol is thus encoded accordingly. For a given channel, its noise characteristics remain nearly constant between symbol transmissions. As a result, the amplitude and phase relation between two constellation points should stay reasonably constant, thereby permitting the encoding of information in the relative phase position. Once across the channel, the received constellation point is point B', in which the receiver circuit 111 detects a 90° phase difference and an amplitude difference of 0. The 90° phase difference indicates to the receiver 111 that point B' should be remapped or decoded as 01. By differentially encoding a signal, information about the channel characteristics are not needed, thus minimizing the impact of a noisy channel. This is possible, in part, because channel characteristics do not change too abruptly. Furthermore, differentially encoding the bit sequence on a consecutive symbol is equivalent to updating the constellation rotation, thereby reducing problems associated with transmitter and receiver clock difference. These inherent noise tolerant characteristics are supplemented by the frequency diversity mechanisms within the DMT system of the present invention.

Figure 4:
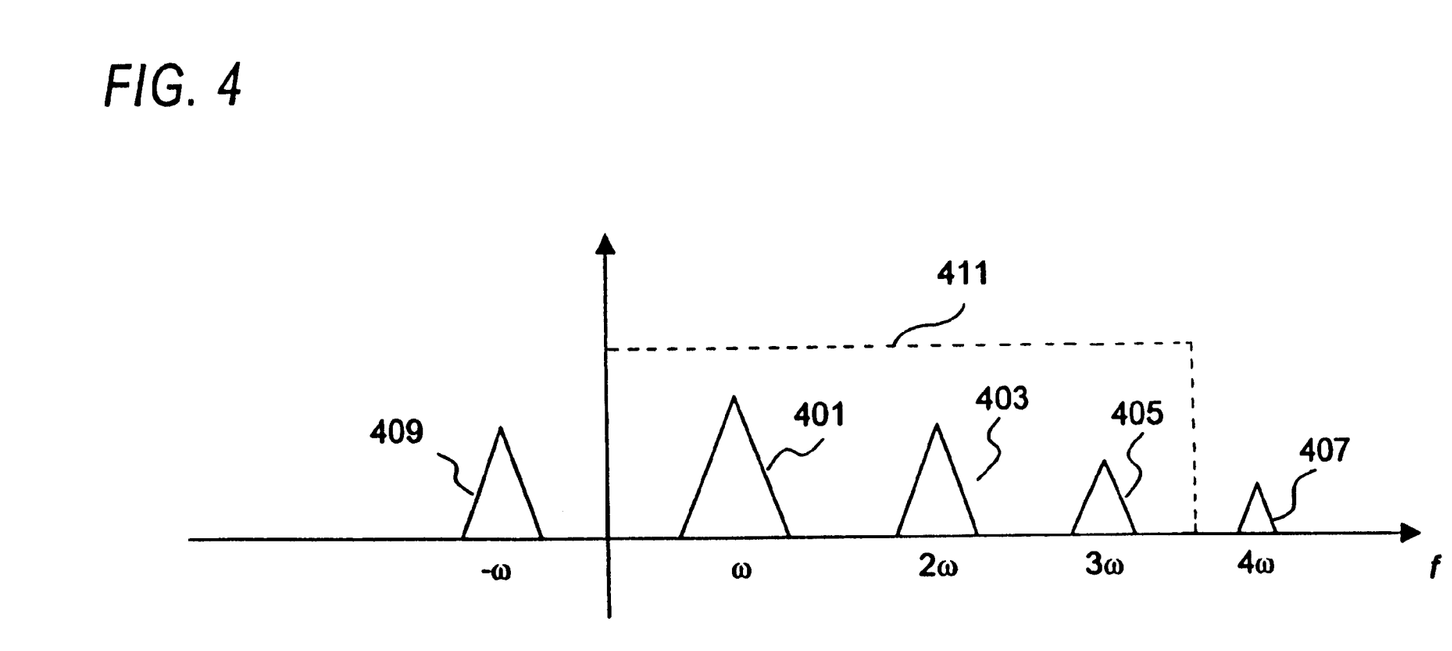
FIG. 4 is an exemplary graph of the spectral images in the DMT system of FIG. 1.

FIG. 4 shows an exemplary spectrum of one tone with a carrier frequency of $\omega$. A tone is a modulating signal that carries the baseband signal (i.e., differentially encoded signals) at the carrier frequency as well as the harmonics, e.g., $2\omega$, $3\omega$, $4\omega$, etc., of the carrier frequencies. The figure shows the spectral images of the baseband signal; the power or energy of these signals diminish with increasing frequency. The frequency response is dictated largely by the D/A conversion of the transmitter 101. Assuming that the channel completely distorts the carrier frequency $\omega$ such that the power spectral density of image 401 is negligible, the encoded information is not lost. The information is preserved in numerous harmonics. In this example, the spectral image of 403 has sufficient power for proper detection by the receiver 111, albeit the power is less than the image at the carrier frequency. Moreover, harmonic $3\omega$ possesses the encoded information as well. The rectangular bar 411 denotes the envelope of the filter 205 (FIG. 2a). The bandwidth of filter 205 in this instance is greater than $3\omega$, so that the main image 401 and two harmonic images 403 and 405 are passed through the filter 205. The images 407 and 409 fall outside the filter range and thus are eliminated. One method to capture more images is to relax the filter 223 (i.e., increase the filter bandwidth) of the transmitter circuit 101. In conjunction with or separate from relaxing the filter, a spectral image selection logic 115 (or frequency selector) in the receiver 111 can determine which images that have been captured by the filter 205 exhibit high power spectral densities so that the detection and demodulation functions of the receiver 111 can focus on these select images.

Figure 5:
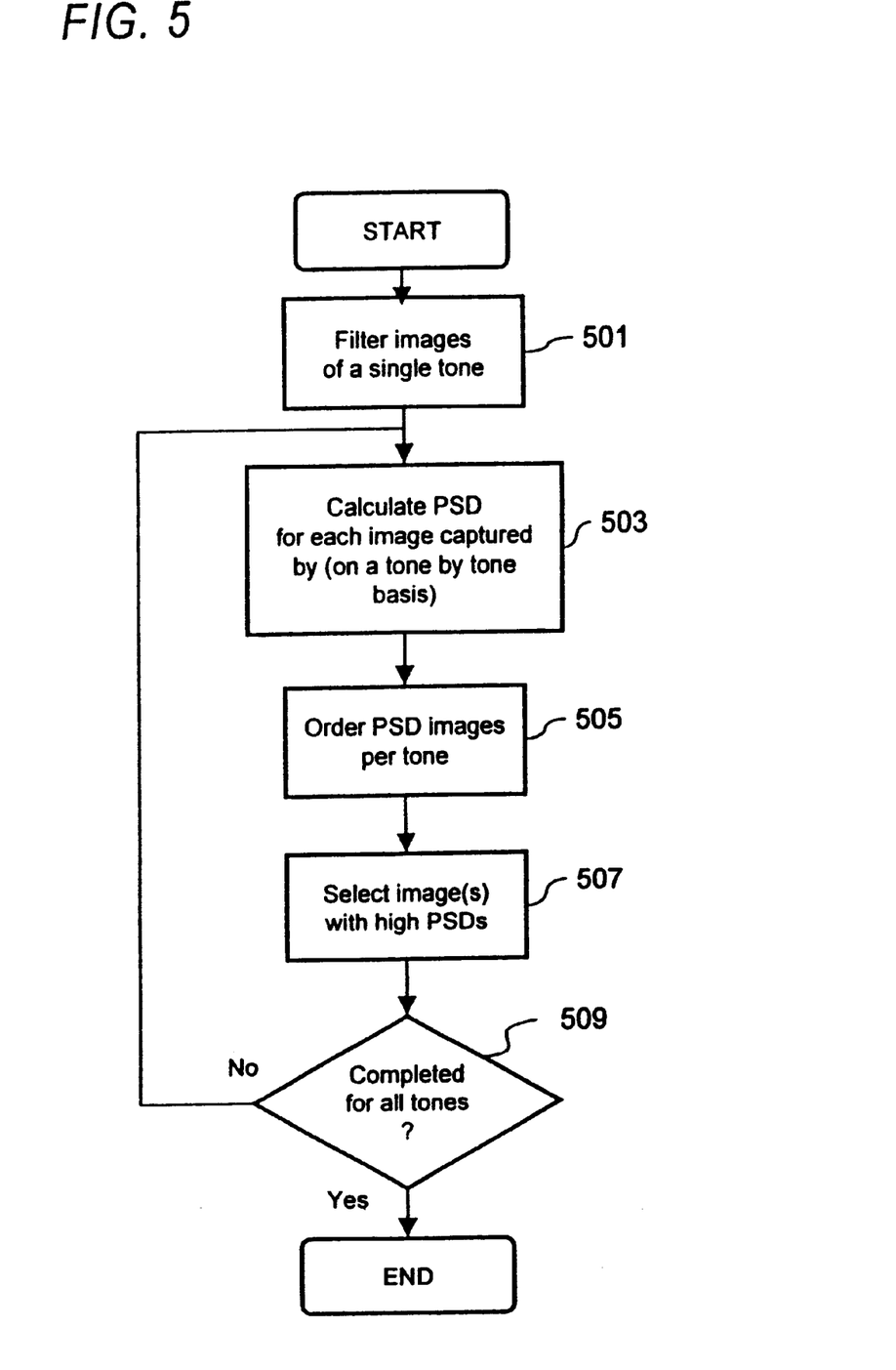
FIG. 5 is a flow diagram of the operation of a spectral image selection logic of the DMT system of FIG. 1 according to an embodiment of the present invention.

FIG. 5 describes the operation of the spectral image selection logic 115. In step 501, the images 401–409 of the tone are filtered, as illustrated in FIG. 4. The spectral image selection logic 115 then calculates, per step 503, the power spectral densities of each of the images that is within the filter range (e.g., 401, 403, and 405). In one exemplary embodiment, the values of the PSDs are stored in memory (not shown) of the spectral image selection logic 115, which in turn orders the PSD values (step 505) to determine which images have high PSDs by comparing to a predetermined threshold value. Thereafter, the spectral image selection logic 115 selects the appropriate images, per step 507. The process is repeated for each tone of the symbol (step 509). According to an exemplary embodiment, the number of tones is 256.

According to the disclosed embodiments, a DMT system using differential encoding provides frequency diversity in one of two ways. The first technique involves using an image selection logic 115 to screen the spectral images associated with each of the 256 tones employed in the DMT system. The spectral image selection logic 115 allows recovery of encoded information despite the loss of a carrier frequency. The second technique requires the transmitter 101 to adjusts its sampling rate to manipulate the spectral images and according filter, which may entail relaxing the filter to capture more images on the harmonics of the carrier frequency. Under these approaches, a DMT transceiver can readily operate in a home LAN environment, despite the noisy channel conditions.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A communication system for transmitting a bit stream, comprising:

a transmitter circuit for generating a symbol comprising differentially encoded signals, each of the differentially encoded signals being mapped to one of a plurality of carrier frequencies based upon the bit stream; and a receiver circuit for receiving the symbol and decoding the differentially encoded signals of the symbol to output the bit stream, the received differentially encoded signals each having a plurality of spectral images associated with the corresponding carrier frequency and harmonics of the corresponding carrier frequency;

wherein the receiver circuit comprises a spectral image selection logic for individually selecting one or more of the spectral images based upon power spectral densities of the spectral images to reconstruct the differentially encoded signals.

2. The communication system as in claim 1, wherein the transmitter circuit comprises:

a differential encoder for mapping the bit stream into corresponding differentially encoded frequency-domain signals, each of the differentially encoded frequency-domain signals being equated to N bits of the bit stream, wherein N is an integer;

frequency-to-time transform logic for converting in a parallel manner each of the differentially encoded frequency-domain signals to time-domain signals;

parallel-to-serial logic for converting the time-domain signals to a serial stream of differentially encoded signals; and an analog front end (AFE) circuit for selectively filtering the differentially encoded signals of the symbol to pass a prescribed number of spectral images, performing digital to analog conversion of the filtered serial stream, and subsequently transmitting the symbol.

3. The communication system as in claim 1, wherein the receiver circuit comprises:

an analog front end circuit (AFE) for receiving the symbol and performing analog to digital conversion of the differentially encoded signals;

serial-to-parallel logic for converting the differentially encoded signals to parallel differentially encoded signals;

time-to-frequency transform logic for converting each of the parallel differentially encoded signals to frequency-domain signals; and differential decoder logic for mapping each of the frequency-domain signals to a corresponding N bits.

4. The communication system as in claim 2, wherein N is equal to 2 bits and quantity of carrier frequencies is 256.

5. The communication system as in claim 1, wherein the symbol further comprises a cyclic prefix to provide symbol separation.

6. The communication system as in claim 2, wherein the frequency-to-time transform logic executes an inverse Fast Fourier Transform.

7. The communication system as in claim 3, wherein the time-to-frequency transform logic executes a Fast Fourier Transform.

8. The communication system as in claim 3, wherein the spectral image selection logic computes the power spectral density of all spectral images captured by the transmitter circuit, the spectral image selection logic ordering and selecting the images based upon the computed power spectral densities.

9. A communication system for transmitting a bit stream, comprising:

a transmitter circuit for generating a symbol comprising differentially encoded signals, each of the differentially encoded signals being mapped to one of a plurality of carrier frequencies based upon the bit stream; and a receiver circuit for receiving symbol and decoding the differentially encoded signals of the symbol to output the bit stream, the received differentially encoded signals each having a plurality of spectral images associated with the corresponding carrier frequency and harmonics of the corresponding carrier frequency;

wherein the transmitter circuit selectively filters the differentially encoded signals of the symbol to pass a prescribed number of spectral images based upon a predetermined sampling rate.

10. The communication system as in claim 9, wherein the transmitter circuit comprises:

a differential encoder for mapping the bit stream into corresponding differentially encoded frequency-domain signals, each of the differentially encoded frequency-domain signals being equated to N bits of the bit stream, wherein N is an integer;

frequency-to-time transform logic for converting in a parallel manner each of the differentially encoded frequency-domain signals to time-domain signals;

parallel-to-serial logic for converting the time-domain signals to a serial stream of differentially encoded signals; and an analog front end (AFE) circuit for performing digital to analog conversion of the filtered serial stream based upon the predetermined sampling rate, and subsequently transmitting the symbol.

11. The communication system as in claim 9, wherein the receiver circuit comprises:

an analog front end circuit (AFE) for receiving the symbol and performing analog to digital conversion of the differentially encoded signals;

serial-to-parallel logic for converting the differentially encoded signals to parallel differentially encoded signals;

time-to-frequency transform logic for converting each of the parallel differentially encoded signals to frequency-domain signals; and differential decoder logic for mapping each of the frequency-domain signals to a corresponding N bits.

12. The communication system as in claim 10, wherein N is equal to 2 bits and quantity of carrier frequencies is 256.

13. The communication system as in claim 9, wherein the symbol further comprises a cyclic prefix to provide symbol separation.

14. The communication system as in claim 10, wherein the frequency-to-time transform logic executes an inverse Fast Fourier Transform.

15. The communication system as in claim 11, wherein the time-to-frequency transform logic executes a Fast Fourier Transform.

16. A method for transmitting a bit stream, comprising the steps of:

generating a symbol comprising differentially encoded signals based upon the bit stream via a plurality of carrier frequencies;

receiving the symbol and decoding the differentially encoded signals of the symbol to output the bit stream, the received encoded signals each having a plurality of spectral images associated with the corresponding carrier frequency and harmonics of the carrier frequency; and providing frequency diversity by analyzing at least one of the harmonics.

17. The method as in claim 16, wherein the step of providing frequency diversity comprises selecting one or more of the spectral images based upon power spectral densities of the spectral images to reconstruct the differentially encode signals.

18. The method as in claim 16, wherein the step of providing frequency diversity comprises:

sampling the differentially encoded signals according to a predetermined sampling rate; and filtering the differentially encoded signals.

19. The method as in claim 16, wherein the step of generating further comprises:

filtering the symbol to pass a prescribed number of spectral images;

transforming the differentially encoded signals from frequency-domain signals to time-domain signals;

creating a serial stream of the time-domain signals; and performing digital to analog conversion of the serial stream.

20. The method as in claim 19, wherein the step of transforming is performed by an inverse Fast Fourier Transform logic.

21. The method as in claim 17, the step of selecting further comprises:

computing the power spectral densities of the spectral images and ordering the spectral images based upon the computed power spectral densities.

22. The method as in claim 16, wherein the step of receiving comprises:

filtering the received symbol;

performing analog to digital conversion of the received differentially encoded signals of the symbol;

converting the digitized differentially encoded signals from serial signals to parallel signals; and transforming the differentially encoded signals into frequency-domain signals.

23. The method as in claim 22, wherein step of transforming is performed by a Fast Fourier Transform logic.

24. The method as in claim 17, wherein the step of selecting is performed by a spectral image selection logic.

* * * * *